Nov. 26, 1963 K. TEER 3,112,458

TRANSISTORIZED SUPPRESSED CARRIER MODULATOR CIRCUIT

Filed Sept. 14, 1960

INVENTOR
Kees Teer
BY
Frank R. Jirfari
AGENT 3,112,458

TRANSISTORIZED SUPPRESSED CARRIER MODULATOR CIRCUIT

Kees Teer, Eindhoven, Netherlands, assignor to North American Philips Company, Inc., New York, N.Y., a corporation of Delaware Filed Sept. 14, 1960, Ser. No. 55,990
Claims priority, application Netherlands Sept. 22, 1959
6 Claims. (Cl. 332—44)

The invention relates to a modulator arrangement with suppressed carrier. For this purpose, use is generally made of a ring modulator comprising two or four rectifiers. However, this has a limitation in that inequality of the rectifiers gives rise to undesirable carrier leakage. To eliminate this leakage, additional steps must be taken, for example the rectifiers must be accurately adjusted.

The invention provides a simple solution dispensing with such steps. It is characterized in that a carrier oscillation is supplied to a rectifier the bias voltage of which is varied in accordance with the modulating oscillation and in that an odd harmonic of the carrier oscillation passed by the rectifier circuit, preferably the third harmonic, is selected out.

The invention will now be described more fully with reference to the drawing.

Figure 1:
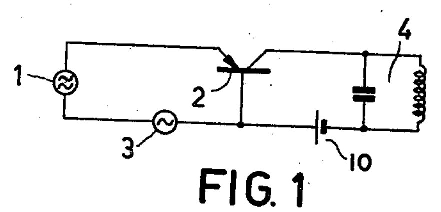
FIG. 1 shows an embodiment given by way of example.
Figure 2:
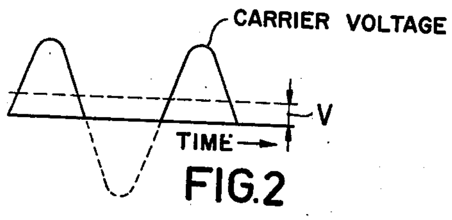
FIGS. 2 and 3 are diagrams illustrating FIG. 1.

In FIG. 1, reference numeral 1 denotes a carrier source. This delivers sinusoidal oscillations of the form shown in FIG. 2, the emitter-base circuit of a transistor 2, which circuit acts as a rectifier, passing only one half of a single polarity (in the case shown, the positive polarity) of the sine wave. The bias voltage for this rectifier is varied in accordance with the voltage V of a source 3. The rectifier circuit does not include any further direct-current sources.

If the modulating oscillation from the source 3 is zero, the passed oscillation will only consist of the fundamental frequency component and even harmonics of the carrier oscillation. By variation of the bias voltage for the rectifier 2 in accordance with the modulating oscillation from the source 3, odd harmonics will also be produced.

Figure 3:
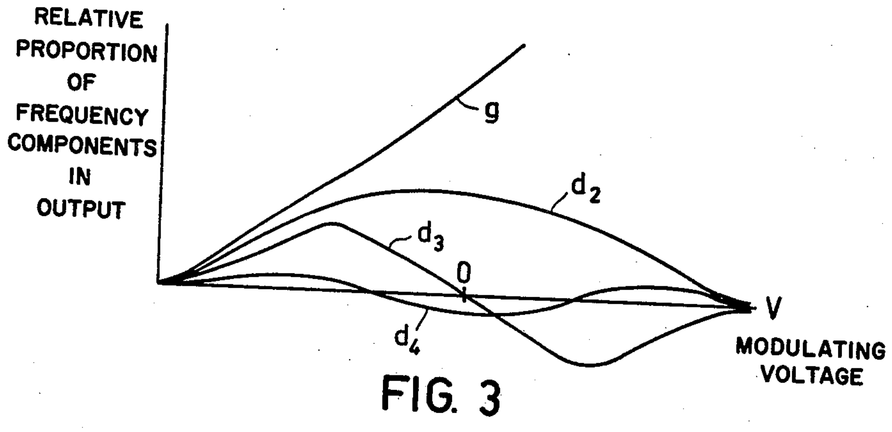

In FIG. 3 the proportions of the fundamental frequency component ($g$), second ($d_2$), third ($d_3$) and fourth ($d_4$) harmonics are shown as a function of the voltage V of the modulating oscillation. When the modulating voltage is zero, the current in the emitter-base circuit of the transistor is rectified to provide a unidirectional current. Since the resultant current has the waveform of a half-wave, it does not have any odd-harmonic components. See, for example, Radio Engineers Handbook, F. E. Terman, McGraw-Hill Book Company, Inc., 1943, at page 22. When a modulating voltage is applied, however, the resultant current is in the form of unidirectional pulses that are sections of sine waves, with the angle of conduction differing from 180 degrees and being determined by the instantaneous amplitude of the modulating voltage. The expression for such a current waveform does contain odd-harmonic components, as is also shown on page 22 of the Radio Engineers Handbook. From this it will be seen that by variation of the voltage V about zeropoint the third harmonic oscillation $d_3$ at a first approximation varies in linear relationship with the voltage V and, when the zero point is exceeded, inverts its phase. The same applies naturally to higher odd harmonics also. In contradistinction thereto, the second and further even harmonics are a maximum at a voltage $V=0$, however, they are substantially not modulated by the voltage V. This facilitates the separation of this third or higher odd harmonic from the remaining harmonics of the carrier signal.

In order to obviate a reaction of the selecting means for the desired harmonic upon the rectifying process, use is preferably made of a separating amplifier. If the transistor 2 is employed as such, it may also perform the function of rectifier. A circuit 4 tuned to the desired odd harmonic, preferably the third harmonic, is included in the collector circuit of the transistor and produces the desired modulated signal. A bias source 10 in series with the circuit 4 provides operating current for the transistor. The source 10 is connected to provide reverse collector bias as in a conventional transistor amplifier.

What is claimed is:

1. A suppressed carrier modulating circuit comprising a series circuit of a source of carrier oscillations, a source of a modulating voltage, and rectifier means, whereby said source of modulating voltage comprises the sole bias for said rectifier means, and output circuit means coupled to said series circuit, said output circuit means comprising resonant circuit means tuned to an odd harmonic of said carrier oscillations.

2. A suppressed carrier modulating circuit comprising a series circuit of a source of carrier oscillations, a source of modulating voltage, and rectifier means, said series circuit providing substantially zero direct voltage bias for said rectifier means, and output circuit means coupled to said series circuit, said output circuit means comprising resonant circuit means tuned to an odd harmonic of said carrier oscillations.

3. A suppressed carrier modulating circuit comprising rectifier means having first and second terminals, circuit means connected between said first and second terminals providing substantially zero direct voltage bias for said rectifier means, a source of carrier oscillations coupled to said circuit means for applying carrier oscillations to said rectifier means, a source of a modulating voltage coupled to said circuit means for applying modulating voltages to said rectifier means, and an output circuit coupled to said circuit means, said output circuit comprising resonant circuit means tuned to an odd harmonic of said carrier oscillations.

4. A suppressed carrier modulating circuit comprising a transistor having emitter, base and collector electrodes, a series circuit of a source of carrier oscillations and a source of modulating voltage connected between said emitter and base electrodes and providing substantially zero direct base-emitter bias voltage for said transistor, and output circuit means connected between said base and collector electrodes, said output circuit means comprising resonant circuit means tuned to an odd harmonic of said carrier oscillations.

5. The circuit of claim 4 wherein said output circuit comprises the series combination of a source of collector bias voltage and a parallel resonant circuit tuned to an odd harmonic of said carrier oscillations.

6. A suppressed carrier modulating circuit comprising a source of carrier oscillations, a source of a modulating voltage, and rectifier means, means to apply said carrier oscillations and said modulating voltage to said rectifier means, whereby said source of modulating voltage comprises the sole bias for said rectifier means, and output circuit means coupled to said rectifier means, said output circuit means comprising resonant circuit means tuned to an odd harmonic of said carrier oscillations.

References Cited in the file of this patent

UNITED STATES PATENTS

| | | |
|---|---|---|
| 1,494,905 | Hartley | May 20, 1924 |
| 2,285,164 | Kummerer | June 2, 1942 |
| 2,616,033 | Adler | Oct. 28, 1952 |
| 2,713,665 | Raisbeck et al. | July 19, 1955 |
| 2,884,599 | Van Deinse | Apr. 28, 1959 |